Feb. 15, 1966 A. BOPP 3,235,662

ARRANGEMENT FOR CORRECTING TIME IRREGULARITIES OF VIDEO SIGNALS

Filed April 19, 1963

3 Sheets-Sheet 1

Inventor:
Achim Bopp
by Michael S. Striker
Attorney

Inventor:
Achim Bopp
by Michael S. Striker
Attorney

Inventor:
Achim Bopp
by Michael S. Striker
Attorney 3,235,662

ARRANGEMENT FOR CORRECTING TIME IRREGULARITIES OF VIDEO SIGNALS

Achim Bopp, Darmstadt, Germany, assignor to Fernseh G.m.b.H., Darmstadt, Germany Filed Apr. 19, 1963, Ser. No. 274,169
Claims priority, application Germany, Apr. 21, 1962, F 36,614
10 Claims. (Cl. 178—69.5)

This invention concerns an arrangement for correcting time irregularities appearing in video signals derived from a magnetic recording thereof and including horizontal synchronization pulses occurring at a frequency which at least occasionally differs from a predetermined and desired line frequency.

In conventional devices for magnetically recording and storing video signals the latter are recorded in tracks extending transversely of a longitudinally moving magnetizable tape by means of magnetic recording heads arranged along the circumference of a rotating head wheel.

In a similar manner the recorded video signals are picked up or read out from the tape. For instance, for storing video signals in accordance with European standards (625 lines and 50 fields per second) the head wheel carrying four magnetic heads equally spaced from each other rotates at a speed of 15,000 r.p.m. or 250 revolutions per second. If the relation of the picked up video signal to time is to be the same as that of the recorded original video signal, then it is necessary that during the reading out operation the speed of the magnet heads relative to the tape and even the angular position of the heads relative to the recorded signal correspond as accurately as possible to said relative speed and angular position of the heads prevailing during the recording of the signals.

Therefore, conventionally regulating devices have been used by which the rotary speed and the angular position of the head wheel are coupled with a reference signal. However, in view of the considerable inertia of the rapidly rotating head wheel only slow variations of the desired time relations can be regulated in this manner with some reliability. Therefore it has been proposed to carry out the desired correction of time irregularities of the signal by means of an arrangement which contains a delay line through which the video signal is passed, the delay applied by the delay line to the video signal being controlled by a control signal. For carrying out the correction as mentioned above only a very minute amount of time is available which is of the order of a few microseconds. Consequently the correction or adjustment of the transit time of the video signal passing through the delay line is expected to comprise the production of pulses which may appear at a frequency of e.g., .5 megacycle and therefore located within the frequency range of video signals which extends approximately between 50 cycles and 5 megacycles. Under these circumstances the difficulty exists that a way must be found to separate the control signal for changing the transmit time of the video signal from the actual video signal.

It is therefore one object of this invention to provide for an arrangement by which time irregularities appearing in video signals derived from a magnetic recording thereof are automatically and promptly corrected without causing any disturbance of the video signal.

It is another object of this invention to provide for an arrangement of the type set forth wherein the signal voltage is prevented from unintentionally changing the transit time of the signal and from causing phase variations depending upon the amplitude of the video signal.

It is still another object of this invention to provide for an arrangement of the type set forth which is comparatively simple in its structure and entirely reliable in operation.

With above objects in view the invention includes an arrangement for correcting time irregularities appearing in video signals derived from a magnetic recording thereof and including horizontal synchronization pulses occurring at a frequency which at least occasionally differs from a predetermined line frequency, comprising, in combination, first input means for supplying the video signals including horizontal synchronization pulses occurring at an at least occasionally varying frequency; second input means for supplying a sequence of reference pulses of predetermined pulse duration and at said predetermined line frequency; control means operatively connected with said first and second input means for producing a control voltage corresponding to the magnitude of a variable time lag between said horizontal synchronization pulses and said reference pulses; delay means operatively connected with said first input means for receiving said video signals and for delivering the same with a delay depending upon said control voltage, said delay means comprising a delay line including inductance means and conductor means arranged in parallel between the input end and the output end thereof and variode means connected transversely between said inductance and conductor means and having a capacity varying with the voltage applied thereto, a first and a second input amplifier means connected in series with each other, one of said input amplifier means being connected with said first input means, and the junction point between said first and second input amplifier means being connected with said input end of said delay line, and first and second output amplifier means connected in series with each other, the junction point between said first and second output amplifier means being connected with said output end of said delay line, said second input and second output amplifier means being both connected with said control means for being supplied thereby with said control voltage and for correspondingly changing the voltage applied by said input amplifier means to said variode means and consequently the delay applied by said delay line to said video signals; and output means connected with said second output amplifier means for delivering the video signal with a delay determined by said delay line, whereby time irregularities occurring in the video signals are automatically and immediately corrected.

It will be seen that the arrangement according to the invention entails the advantage that both the control voltage and the video signal voltage can be introduced into the arrangement without any undesired side effects, and that both voltages can be applied jointly or in super-position to the delay line while nevertheless only the corrected video signal voltage appears at the output of the arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
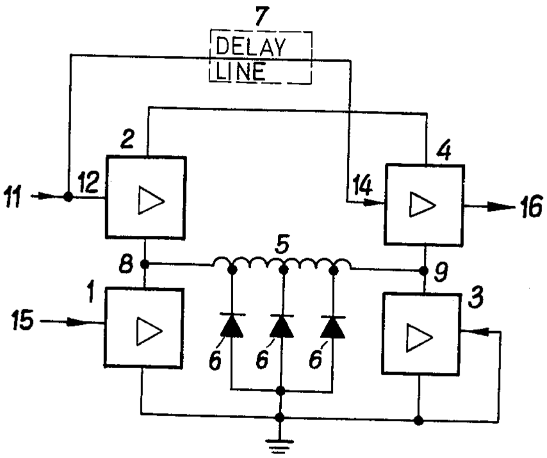
FIG. 1 is a block diagram illustrating the fundamental structural of an arrangement according to the invention.

In the center of FIG. 1 a delay line is illustrated which comprises inductances 5 and transversely connected variodes 6 and is connected between two junction points 8 and 9. The term "variode" used hereinafter has been coined for designating semi-conductor diodes which are operated in their blocking condition and which have a capacity determined by the blocking layer acting as a dielectric, this capacity varying with the voltage applied to the terminals of these diodes. Consequently, by varying the capacity of the variodes 6 the transit time or the delay applied to the video signal while passing through the delay line can be varied by changing the voltage applied to the variodes 6.

On the input side of the delay line 5, 6 two input amplifiers 1, 2 are provided which are connected in series with each other in cascade manner with the junction point 8 located therebetween. In a similar manner two output amplifiers 3 and 4 connected in the same manner in series with the junction point 9 therebetween are arranged at the output end of the delay line 5, 6. At the first input 15 the video signal is introduced into the arrangement, while at a second input 11 a control signal as mentioned above and produced in the manner described below is applied both to the input 12 of the second input amplifier 2 and to the input 14 of the second output amplifier 4. As will be described further below the control voltage applied to the input 11 serves to control the magnitude of the delay produced by the delay line 5, 6.

The amplifiers 2 and 4 can be controlled by the application of the above mentioned control voltage at the second input 11. In the absence of a control signal the series-connected amplifiers 1, 2, and 3, 4 are not subject to any control and constitute therefor a constant usually rather high resistance. However, when a control signal is applied to the amplifiers 2 and 4 a corresponding change of potential at the junction points 8 and 9 and therefore in the entire delay line results. This entails a change of the voltage applied to the variodes 6 and consequently a change of their effective capacity. Since the transit time of a delay line of the type described and illustrated is proportional to $\sqrt{CL}$ i.e. to the root of the product of inductivity and capacity of the delay line, the transit time changes in proportion to the root of the capacity change produced in the variodes 6.

It is advantageous to use the first amplifier 1 for introducing the video signal. If this is done in the manner illustrated by FIG. 1 then the junction point 8 will carry not only the control voltage but also voltage of the video signal so that both these voltages are applied jointly or in superposed relation from the junction point 8 to the delay line 5, 6.

Under these circumstances the junction point 9 will carry in superposed condition or relation both the delayed video signal voltage and the control voltage. This combined voltage will be applied to the amplifier 4. However, if, according to the invention the amplifier 4 operates as a differential amplifier then the control signal will be eliminated therein and at the output 16 of the output amplifier 4 only the delayed video signal will be delivered.

However, it is to be understood that the differential amplifier 4 will operate in this manner only as long as the time required for the control voltage to rise from a lower starting value to its peak is longer than the transit time of the delay line. If also control voltages with a smaller or shorter rise time are to be separated from the video signal voltage, then the control voltage may be introduced into the amplifier 4 via an additional second delay line 7 which in this case should have a constant transit time preferably equal to the mean value of the transit time of the controllable delay line 5, 6. In this case the minimum rise time of the control voltage may be reduced even to a value which is equal to the maximum difference between the transit times of the delay lines 7 and 5, 6, in which case still a precise separation of the video signals from the control voltage will be achieved.

Figure 2:
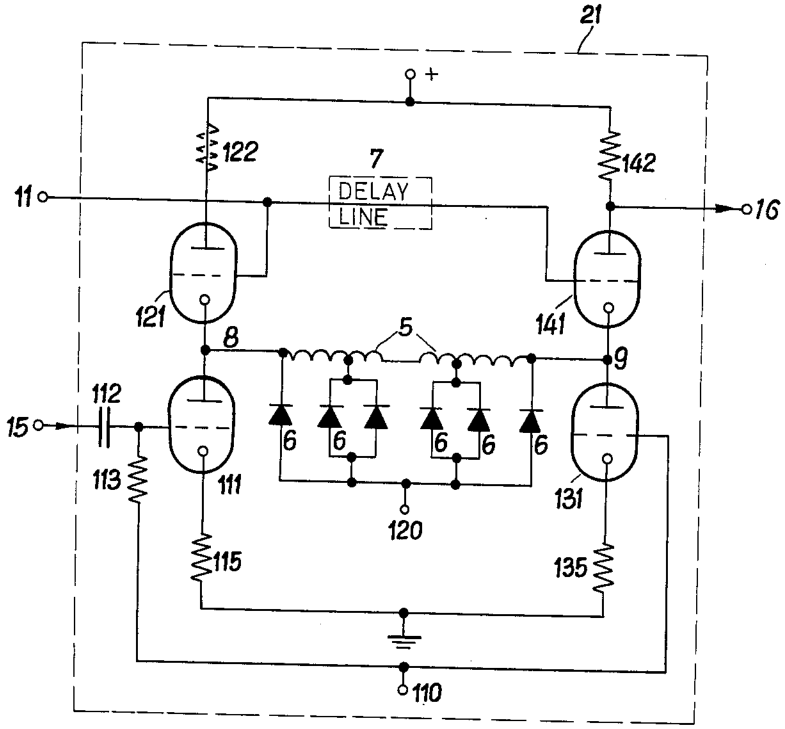
FIG. 2 is a diagrammatic circuit diagram illlustrating a preferred form of the arrangement according to FIG. 1.

FIG. 2 illustrates a satisfactorily operating arrangement according to the invention in which grid-controllable electron tubes are used as amplifiers. Of the delay line comprising the inductances 5 in longitudinal arrangement and the variodes 6 in transverse arrangement only two portions, one at the input end and one at the output end of the delay line, are shown. In order to obtain a range of delay or transit time variation as required for the purpose of this invention it is usually necessary to provide for a delay line having a much greater number of the above described elements. Each of the transverse capacitor elements comprises two variodes 6 in parallel arrangement. However, at the start and at the end of the delay line only one single variode 6 is provided which consequently has only one half of the capacity of the other capacitive transverse elements. The two input amplifier tubes 111 and 121 as well as the output amplifier tubes 131 and 141, respectively, arranged at the beginning and at the end of the delay line are respectively connected in series with each other in the well known cascade manner since the anode of the first tube 111 or 131, respectively, is connected with the cathode of the second tube 121 or 141, respectively. The delay line 5, 6 is connected between the junction points 8 and 9 located within the above mentioned connections between the tubes. From the input 11 the control voltage is applied to the control grids of both the tubes 121 and 141. Consequently, the video signal which is to be delayed and which is applied at the input terminal 15 travels via the capacitor 112 to the control grid of the first input tube 111, this control grid being supplied via resistor 113 with a suitable bias voltage from terminal 110 which is connected to a corresponding source, not shown.

The same bias voltage is also applied to the control grid of the first output tube 131 so that, in the absence of a video signal appearing at the input 15, the grids of both tubes 111 and 131 carry the same voltage. Since also the tubes 121 and 141 are supplied, when a control signal appears at input 11, with the same grid control voltage, equal currents will flow in the two groups of tubes 111, 121 and 131, 141, respectively, provided that the tubes are of the same type and have the same characteristics. Under these circumstances no voltage difference will exist between the junction points 8 and 9. If now the control voltage at the input 11 should vary, the potential existing at the junction points 8 and 9 is shifted uniformly in relation to a grounded reference potential. Since it has to be assumed that the common conductor passing along the variodes 6 is connected to a suitable reference potential via the terminal 120, the application of a control voltage from terminal 11 has the effect that the voltage applied to the variodes 6 is correspondingly changed, and thereby also the capacity of all the variodes 6 is uniformly changed as has been explained above in reference to FIG. 1.

If now a video signal voltage is applied from input 15 to the grid of the tube 111, this video signal voltage will appear at the junction point 8 and is superimposed on the control voltage also existing at this junction point 8. Both these superimposed voltages will appear also at the junction point 9 with a delay determined by the prevailing transit time of the delay line, so that now the output tube 141 is controlled at its cathode by both these voltages jointly. However, only the control voltage from input 11 is applied to the grid of tube 141 so that only the difference between the voltage existing at the control grid and the voltage existing at the cathode, i.e. only the delayed video signal voltage will appear at the output 16 of the tube 141, but of course in amplified form whereby a corresponding voltage drop is produced in the anode resistor 142. This voltage drop determines the output voltage of the arrangement. For the sake of symmetry the anode circuit of the tube 121 may include a similar or equal resistor 122. Also in the cathode circuits of the tubes 111 and 131 resistors 115 and 135 may be provided which serve as a negative feedback means for the tubes 111 and 131 so that thereby the arrangement is more independent of possibly existing differences between the characteristics of the individual tubes.

Figures 3, 5:
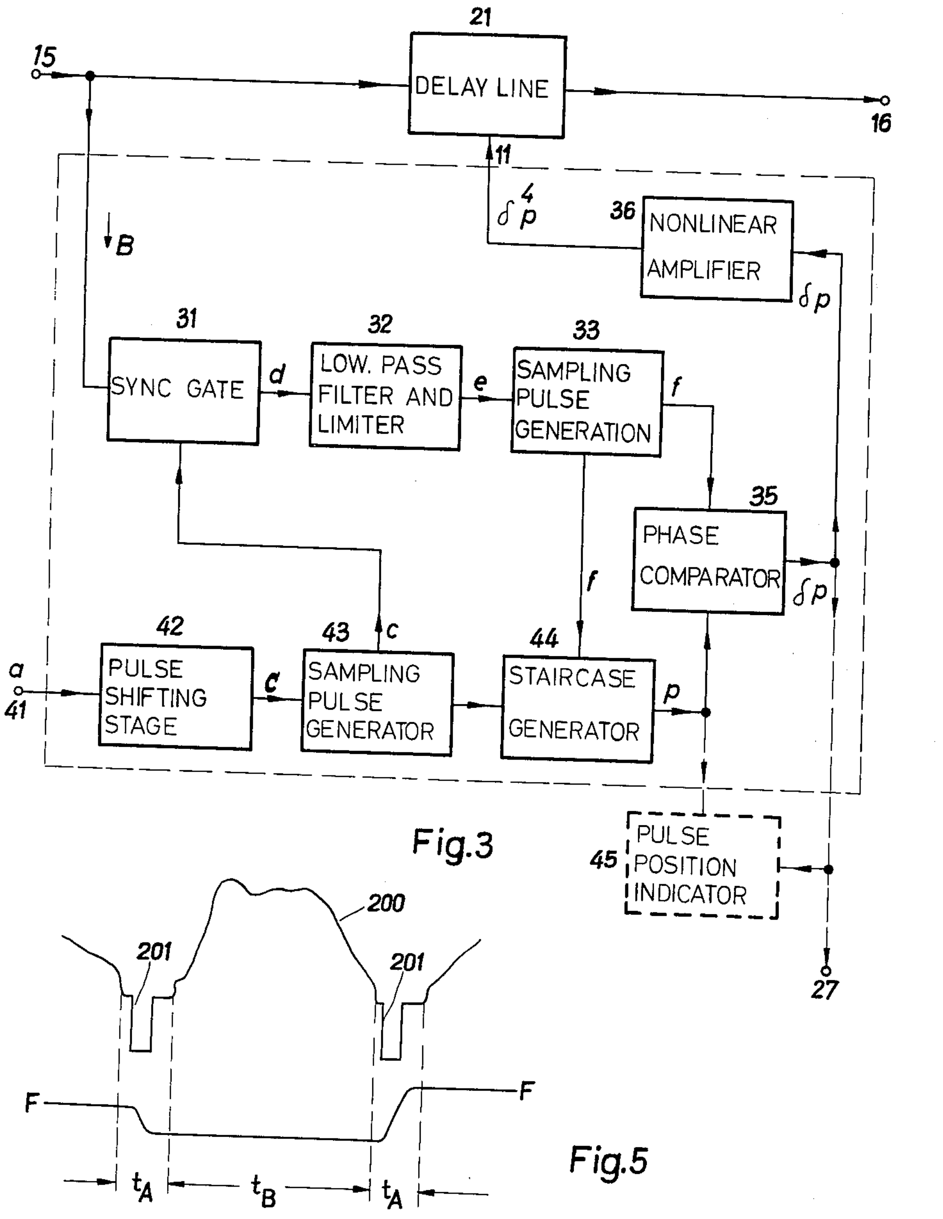
FIG. 3 is a block diagram illustrating mainly an arrangement for producing the control voltage required in an arrangement according to the invention.
FIG. 5 is a graph illustrating a video signal sequence and in relation thereto the control signal used in the operation of an arrangement according to the invention.
Figure 4:
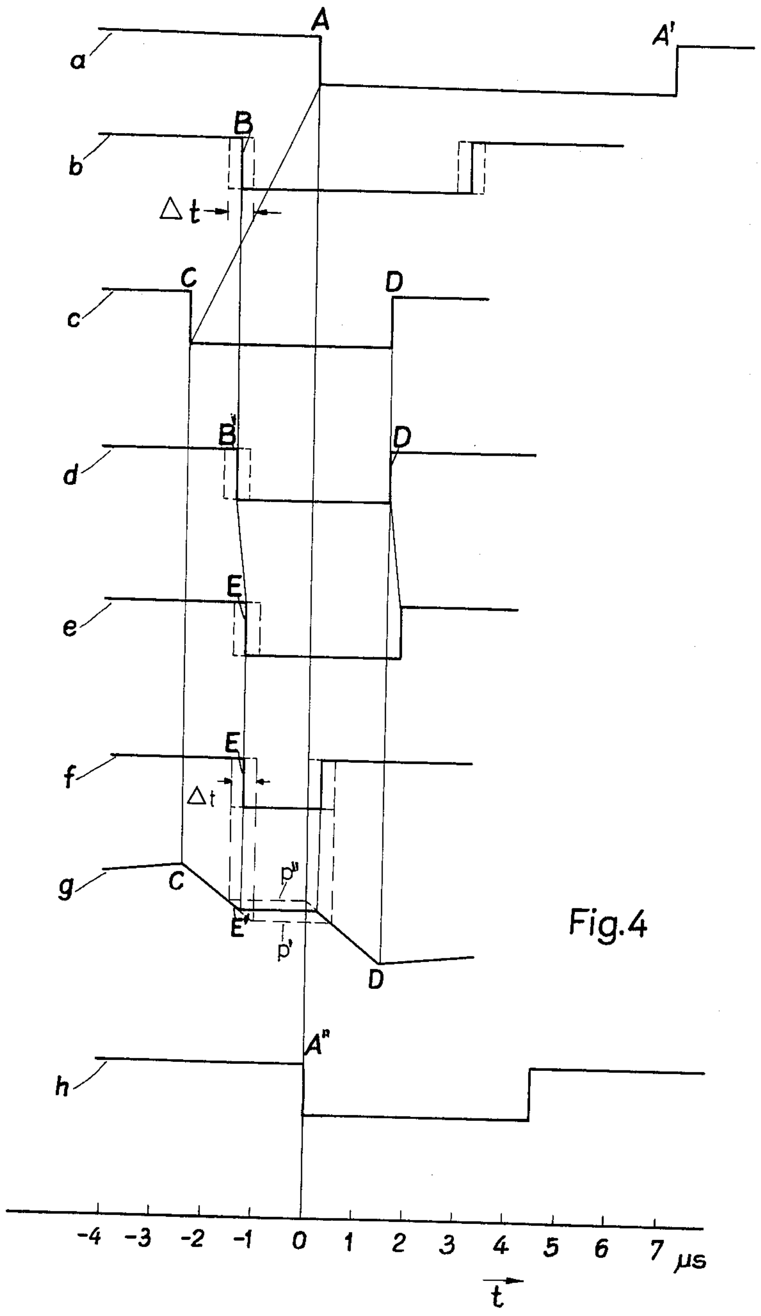
FIG. 4 is a graph illustrating the various pulses occurring in the operation of the arrangement according to the invention and their time relations.

FIG. 3 serves to illustrate a practical embodiment of an arrangement according to the invention including the means for producing the control voltage by which the transit time of the delay line is to be changed. In FIG. 3 the block 21 comprises or represents substantially the entire arrangement of FIG. 2. A conventional gate circuit 31 serves to extract from the video signal applied to the delay line arrangement 21 at the input terminal 15 the leading flank of the horizontal synchronization pulse contained in the video signal. For explaining the operation of the circuit according to FIG. 3 reference is made simultaneously to FIG. 4. In FIG. 4 the line *a* represents a reference pulse *a* produced by a source not shown and applied to terminal 41 in FIG. 3 as a series of reference pulses having a predetermined fixed line frequency, the individual pulse having a leading flank A and a terminating flank A'. Thus the duration of these reference pulses according to the time scale of FIG. 4 would amount to e.g. 7 μsec. In FIG. 4 line *b* represents the normal horizontal synchronization pulse *b* contained in the video signal. As can be seen there is a time lag between the leading flank A of the reference pulses *a* and the leading flank B of the horizontal synchronization pulse of the video signal. As mentioned above it is to be expected that the magnitude of this time lag may vary and this is illustrated by the dotted lines across line *b*, the variation of the time lag being illustrated by the dimension $\Delta t$. Returning to FIG. 3, the pulse shifting stage 42 produces a control pulse *c* as illustrated in FIG. 4 by a line *c*, the leading flank C whereof is shifted forward relative to the leading flank A of the reference impulse *a*. It is of great importance to see to it that this control pulse *c* has the same time accuracy as the reference pulse *a*. For this purpose the pulse shifting stage 42 may comprise a sawtooth voltage generator which is synchronized by the leading flank A of the reference pulse *a* and which produces a sawtooth voltage of comparatively large amplitude and linear voltage rise. The leading flank C of the control pulse *c* is obtained by cutting the peak of the sawtooth voltage wave.

By means of the sampling pulse generator 43 in FIG. 3 the pulse *c* having the leading flank C is formed with a definite length or duration as indicated at D in FIG. 4. This pulse *c* is applied to the synchronization gate 31 which therefore furnishes an impulse *d* as illustrated in FIG. 4 and whose leading flank B' corresponds exactly in its location to the leading flank B of the synchronization pulse *b* of the video signal, while its terminating flank D has a fixed location corresponding to the terminating flank D of the pulse *c*.

The thus obtained pulse *d* is now applied to the device 32 which comprises a conventional low pass filter circuit and a limiter circuit of conventional type whereby the pulse *d* is freed of possibly superimposed disturbances and is at the same time limited in its amplitude in both directions. Preferably the limiter circuit is adjustable so that it is possible to define and select by means of the limiter circuit an amplitude range of the pulse *d* which is as free as possible of disturbances. By passing through the low pass filter circuit the pulse *d* is subjected to a minute delay so that after passing through the low pass filter and limiter circuits of the device 32 the pulse *d* appears as the pulse *e* illustrated by line *e* in FIG. 4 with the leading flank E corresponding to the leading flank B' of the pulse *d*. By means of a conventional sampling pulse generator 33 a pulse *f* as illustrated by line *f* of FIG. 4 is produced, the pulse *f* having a leading flank E coinciding with the leading flank E of the pulse *e* but has a constant pulse duration which is shorter than that of the pulse *e*. Nevertheless, the time variations $\Delta t$ of the leading flank B of the horizontal synchronization pulses *b* are exactly reproduced and maintained in the variations $\Delta t$ of the occurrence of the leading flank E of the pulse *f*. In the meantime a sawtooth-shaped signal is produced by the conventional staircase generator 44 which is connected with the sampling pulse generator 43 so that the leading flank C of the pulse *c* furnished by the device 43 initiates the sawtooth-shaped signal. Consequently, the start of the sawtooth-shaped signals *g* illustrated by line *g* in FIG. 4 coincides exactly with the leading flank C of the signal *c* and the sawtooth pulses are therefore bound to occur with the same accurate timing as the pulses *c* i.e. also as the reference pulses *a*. By application of the pulse *f* from the sampling pulse generator 33 to the staircase generator 44 the sawtooth-shaped signal *g* is interrupted for the duration of the pulse *f* as can be seen from FIG. 4. As can be seen also from FIG. 4, since the position of the pulse *f* may fluctuate within the range marked $\Delta t$ and indicated in dotted lines, the point E' along the slope of the sawtooth pulse *g* may occur sometimes earlier and sometimes later so that the horizontal step or shoulder produced in the sawtooth pulse *g* by the application of the pulse *f* will correspondingly have a varying potential, which may vary between the level $p'$, $p''$. Consequently, the potential level of the step starting at E' always corresponds to the deviation in time of the occurrence of the horizontal synchronization pulse or its leading flank B as compared with the desired moment of its occurrence. In other words, the potential difference $p''-p'$ corresponds to the time differential or time error $\Delta t$. The potential or voltage *p* representing the level of the above described shoulder in the sawtooth pulse *g* is applied to a phase comparator 35 of conventional type wherein the values *p* are compared with the pulse *f* furnished to the device 35 by the sampling pulse generator 33. As a result a control voltage $\delta p$ representing any occurring deviation of the potential *p* from a desired value is supplied from the device 35 to the input 11 of the delay line arrangement 21 as described further above.

It will be understood that in view of the above the error indicating potential *p* is illustrated by the curve F in FIG. 5 in relation to the video signal 200 comprising also the horizontal synchronization pulses having their leading flanks at 201. Each line period contains the time $t_B$ for the actual picture signal and the horizontal blanking period $t_A$.

As can be seen from FIG. 5, an arrangement as illustrated by FIGS. 1–3 is perfectly suitable for correcting any time shift of the leading flank 201 of the horizontal synchronization pulse i.e. for correcting the corresponding transit time of the video signal through the delay arrangement, and for doing this within the horizontal blanking interval. The control voltage or correcting voltage $\delta p$ remains unchanged during the picture signal time $t_B$ and changes only during the horizontal blanking interval $t_A$ as shown in FIG. 5. Consequently, at the beginning of each scanning line following each horizontal synchronization pulse the delay line in the device 21 is already adjusted concerning its transit time or delay by the control voltage or error potential $\delta p$ applied to the input 11 so that hereby an existing time irregularity is immediately and automatically corrected with the result that at the end of the delay line the leading flank A'' of the synchronization pulse *h* of FIG. 4 coincides in time and accuracy with the leading flank A of the reference pulse *a*.

One more detail has to be taken into consideration. Before the error potential $\delta p$ is applied from the phase comparator 35 to the input 11 of the delay line arrangement 21, it is passed through a non-linear amplifier 36. In this device 36 the error potential $\delta p$ is subjected to a non-linear deformation in such a manner that the output voltage of the device 36 is proportional to the fourth power of its input voltage. This deformation is necessary because the capacity of the variodes 6 of FIGS. 1 and 2 varies in proportion to the square root of the applied voltage. However, since the transit time in the delay line also varies in proportion with the square root of the capacity of the transversely arranged delay line members, the transit time is actually proportional to the fourth root of the voltage applied to the variodes. On the other hand, the error voltage $\delta p$ produced by the arrangement according to FIG. 3 is linearly proportional to the occurring time irregularity. In order to cause the transit time of the delay line to vary in linear proportion to the actually occurring time shift or error, it is accordingly necessary to vary the control voltage or error voltage $\delta p$ applied to the delay line arrangement 21 in proportion to the fourth power of the produced error voltage $\delta p$.

Obviously, it is desirable to keep the dimension of the actual delay line i.e. the number of inductance-capacity elements thereof, within reasonable limits. Therefore it is likewise desirable to arrange matters so that the maximum time irregularity that is to be corrected by the arrangement according to the invention, is as small as possible from the outset. Evidently the magnitude of this error which is to be corrected depends on the quality of the regulator means mechanically influencing the speed of the recording or pick-up heads relative to the magnetizable tape and the devices regulating the relative angular position of the heads with respect to the video signal being recorded. In order to keep this error to be corrected small it may be advisable to use the error voltage $\delta p$ produced by the arrangement according to FIG. 3 for influencing the mechanical regulating devices mentioned above connected at 27 in such a manner that the error to be corrected is reduced in size. It is further advisable to construct the delay line means so that the transit time thereof is automatically regulated so as to adjust itself to a mean value of its range of variation, during a time period embracing several scanning line periods, because in this manner the available range of correcting or changing the transit time of the delay line can be most advantageously utilized.

Also, it may be advisable to provide for an indication of the magnitude of the existing time irregularities so that an observer can see from an indicating instrument in the pulse position indicator 45 in FIG. 3 whether the time irregularity to be corrected is still within the range of variability of the transit time of the delay line. For this purpose e.g. a differential amplifier may be provided which is supplied with a mean value of the error voltage $\delta p$, on one hand, and with the mean value of the sawtooth voltage $g$, on the other hand. The output of the differential amplifier will furnish in this case the desired indication.

It will be understood that each of the elements described above, or two or more together, may also find a useful application in other types of an arrangement for correcting time irregularities of a video signal differing from the types described above.

While the invention has been illustrated and described as embodied in an arrangement for correcting time irregularities of a video signal derived from a magnetic recording thereof, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for correcting time irregularities appearing in video signals derived from a magnetic recording thereof and including horizontal synchronization pulses occurring at a frequency which at least occasionally differs from a predetermined line frequency, comprising, in combination, first input means for supplying the video signals including horizontal synchronization pulses occuring at an at least occasionally varying frequency; second input means for supplying a sequence of reference pulses of predetermined pulse duration and at said predetermined line frequency; control means operatively connected with said first and second input means for producing a control voltage corresponding to the magnitude of a variable time lag between said horizontal synchronization pulses and said reference pulses; delay means operatively connected with said first input means for receiving said video signals and for delivering the same with a delay depending upon said control voltage, said delay means comprising a delay line including inductance means and conductor means arranged in parallel between the input end and the output end thereof and variode means connected transversely between said inductance and conductor means and having a capacity varying with the voltage applied thereto, a first and a second input amplifier means connected in series with each other, one of said input amplifier means being connected with said first input means, and the junction point between said first and second input amplifier means being connected with said input end of said delay line, and first and second output amplifier means connected in series with each other, the junction point between said first and second output amplifier means being connected with said output end of said delay line, said second input and second output amplifier means being both connected with said control means for being supplied thereby with said control voltage and for correspondingly changing the voltage applied by said input amplifier means to said variode means and consequently the delay applied by said delay line to said video signals; and output means connected with said second output amplifier means for delivering the video signal with a delay determined by said delay line, whereby time irregularities occurring in the video signals are automatically and immediately corrected.

2. An arrangement for correcting time irregularities appearing in video signals derived from a magnetic recording thereof and including horizontal synchronization pulses occurring at a frequency which at least occasionally differs from a predetermined line frequency, comprising, in combination, first input means for supplying the video signals including horizontal synchronization pulses occurring at an at least occasionally varying frequency; second input means for supplying a sequence of reference pulses of predetermined pulse duration and at said predetermined line frequency; control means operatively connected with said first and second input means for producing a control voltage corresponding to the magnitude of a variable time lag between said horizontal synchronization pulses and said reference pulses; delay means operatively connected with said first input means for receiving said video signals and for delivering the same with a delay depending upon said control voltage, said delay means comprising a delay line including inductance means and conductor means arranged in parallel between the input end and the output end thereof and variode means connected transversely between said inductance and conductor means and having a capacity varying the voltage applied thereto, a first and a second input amplifier means connected in series with each other, said first input amplifier means being connected with said first input means, and the junction point between said first and second input amplifier means being connected with said input end of said delay line, and first and second output amplifier means connected in series with each other, the junction point between said first and second output amplifier means being connected with said output end of said delay line, said second input and second output amplifier means being both connected with said control means for being supplied thereby with said control voltage and for correspondingly changing the voltage applied by said input amplifier means to said variode means and consequently the delay applied by said delay line to said video signals; and output means connected with said second output amplifier means for delivering the video signal with a delay determined by said delay line, whereby time irregularities occurring in the video signals are automatically and immediately corrected.

3. An arrangement for correcting time irregularities appearing in video signals derived from a magnetic recording thereof and including horizontal synchronization pulses occurring at a frequency which at least occasionally differs from a predetermined line frequency, comprising, in combination, first input means for supplying the video signals including horizontal synchronization pulses occurring at an at least occasionally varying frequency; second input means for supplying a sequence of reference pulses of predetermined pulse duration and at said predetermined line frequency; control means operatively connected with said first and second input means for producing a control voltage corresponding to the magnitude of a variable time lag between said horizontal synchronization pulses and said reference pulses; delay means operatively connected with said first input means for receiving said video signals and for delivering the same with a delay depending upon said control voltage, said delay means comprising a delay line including inductance means and conductor means arranged in parallel between the input end and the output end thereof and variode means connected transversely between said inductance and conductor means and having a capacity varying the voltage applied thereto, a first and a second input amplifier means connected in series with each other, said first input amplifier means being connected with said first input means, and the junction point between said first and second input amplifier means being connected with said input end of said delay line so that control voltage and said video signal are applied superimposedly to said delay line, and first and second output amplifier means connected in series with each other, the junction point between said first and second output amplifier means being connected with said output end of said delay line, said second input and second output amplifier means being both connected with said control means for being supplied thereby with said control voltage and for correspondingly changing the voltage applied by said input amplifier means to said variode means and consequently the delay applied by said delay line to said video signals, said second output amplifier means being a differential amplifier so that only said video signal is delivered at its output; and output means connected with said second output amplifier means for delivering the video signal with a delay determined by said delay line, whereby time irregularities occurring in the video signals are automatically and immediately corrected.

4. An arrangement for correcting time irregularities appearing in video signals derived from a magnetic recording thereof and including horizontal synchronization pulses occurring at a frequency which at least occasionally differs from a predetermined line frequency, comprising, in combination, first input means for supplying the video signals including horizontal synchronization pulses occurring at an at least occasionally varying frequency; second input means for supplying a sequence of reference pulses of predetermined pulse duration and at said predetermined line frequency; control means operatively connected with said first and second input means for producing a control voltage corresponding to the magnitude of a variable time lag between said horizontal synchronization pulses and said reference pulses; delay means operatively connected with said first input means for receiving said video signals and for delivering the same with a delay depending upon said control voltage, said delay means comprising a first delay line including inductance means and conductor means arranged in parallel between the input end and the output end thereof and variode means connected transversely between said inductance and conductor means and having a capacity varying with the voltage applied thereto, a first and a second input amplifier means connected in series with each other, one of said input amplifier means being connected with said first input means, and the junction point between said first and second input amplifier means being connected with said input end of said delay line, and first and second output amplifier means connected in series with each other, the junction point between said first and second output amplifier means being connected with said output end of said delay line, said second input and second output amplifier means being both connected with said control means for being supplied thereby with said control voltage and for correspondingly changing the voltage applied by said input amplifier means to said variode means and consequently the delay applied by said delay line to said video signals, a second delay line having a signal transit time substantially equal to the means transit time of said first delay line being inserted between said control means and said second output amplifier means; and output means connected with said second output amplifier means for delivering the video signal with a delay determined by said delay line, whereby time irregularities occurring in the video signals are automatically and immediately corrected.

5. An arrangement for correcting time irregularities appearing in video signals derived from a magnetic recording thereof and including horizontal synchronization pulses occurring at a frequency which at least occasionally differs from a predetermined line frequency, comprising, in combination, first input means for supplying the video signals including horizontal synchronization pulses occurring at an at least occasionally varying frequency; second input means for supplying a sequence of reference pulses of predetermined pulse duration and at said predetermined line frequency; control means operatively connected with said first and second input means for producing a control voltage corresponding to the magnitude of a variable time lag between said horizontal synchronization pulses and said reference pulses; delay means operatively connected with said first input means for receiving said video signals and for delivering the same with a delay depending upon said control voltage, said delay means comprising a first delay line including inductance means and conductor means arranged in parallel between the input end and the output end thereof and variode means connected transversely between said inductance and conductor means and having a capacity varying with the voltage applied thereto, a first and a second input amplifier means connected in series with each other, said first input amplifier means being connected with said first input means, and the junction point between said first and second input amplifier means being connected with said input end of said delay line, and first and second output amplifier means connected in series with each other, the junction point between said first and second output amplifier means being connected with said output end of said delay line, said second input and second output amplifier means being both connected with said control means for being supplied thereby with said control voltage and for correspondingly changing the voltage applied by said input amplifier means to said variode means and consequently the delay applied by said delay line to said video signals, a second delay line having a signal transit time substantially equal to the mean transit time of said first delay line being inserted between said control means and said second output amplifier means; and output means connected with said second output amplifier means for delivering the video signal with a delay determined by said delay line, whereby time irregularities occurring in the video signals are automatically and immediately corrected.

6. An arrangement for correcting time irregularities appearing in video signals derived from a magnetic recording thereof and including horizontal synchronization pulses occurring at a frequency which at least occasionally differs from a predetermined line frequency, comprising, in combination, first input means for supplying the video signals including horizontal synchronization pulses occurring at an at least occasionally varying frequency; second input means for supplying a sequence of reference pulses of predetermined pulse duration and at said predetermined line frequency; control means operatively connected with said first and second input means for producing a control voltage corresponding to the magnitude of a variable time lag between said horizontal synchronization pulses and said reference pulses; delay means operatively connected with said first input means for receiving said video signals and for delivering the same with a delay depending upon said control voltage, said delay means comprising a first delay line including inductance means and conductor means arranged in parallel between the input end and the output end thereof and variode means connected transversely between said inductance and conductor means and having a capacity varying with the voltage applied thereto, a first and a second input amplifier means connected in series with each other, said first input amplifier means being connected with said first input means, and the junction point between said first and second input amplifier means being connected with said input end of said delay line, and first and second output amplifier means connected in series with each other, the junction point between said first and second output amplifier means being connected with said output end of said delay line, said second input and second output amplifier means being both connected with said control means for being supplied thereby with said control voltage and for correspondingly changing the voltage applied by said input amplifier means to said variode means and consequently the delay applied by said delay line to said video signals, said second output amplifier means being a differential amplifier so that only said video signal is delivered at its output, a second delay line having a signal transit time substantially equal to the mean transit time of said first delay line being inserted between said control means and said second output amplifier means; and output means connected with said second output amplifier means for delivering the video signal with a delay determined by said delay line, whereby time irregularities occurring in the video signals are automatically and immediately corrected.

7. An arrangement for correcting time irregularities appearing in video signals derived from a magnetic recording thereof and including horizontal synchronization pulses occurring at a frequency which at least occasionally differs from a predetermined line frequency, comprising, in combination, first input means for supplying the video signals including horizontal synchronization pulses occurring at an at least occasionally varying frequency; second input means for supplying a sequence of reference pulses of predetermined pulse duration and at said predetermined line frequency; control means operatively connected with said first and second input means for producing a control voltage corresponding to the magnitude of a variable time lag between said horizontal synchronization pulses and said reference pulses; delay means operatively connected with said first input means for receiving said video signals and for delivering the same with a delay depending upon said control voltage, said delay means comprising a delay line including inductance means and conductor means arranged in parallel between the input end and the output end thereof and variode means connected transversely between said inductance and conductor means and having a capacity varying with the voltage applied thereto, a first and a second input amplifier means comprising each a grid-controllable amplifier tube and having the anode of the first amplifier tube connected in series with the cathode of the second one, the control grid of one of said input amplifier tube being connected with said first input means, and the junction point between said first and second input amplifier means being connected with said input end of said delay line, and first and second output amplifier means comprising each a grid-controllable amplifier tube and having the anode of the first amplifier tube connected in series with the cathode of the second one, the junction point between said first and second output amplifier tubes being connected with said output end of said delay line, the control grids of said second input and second output amplifier tubes being both connected with said control means for being supplied thereby with said control voltage and for correspondingly changing the voltage applied by said input amplifier menas to said variode means and consequently the delay applied by said delay line to said video signals; and output means connected with said second output amplifier means for delivering the video signal with a delay determined by said delay line, whereby time irregularities occurring in the video signals are automatically and immediately corrected.

8. An arrangement for correcting time irregularities appearing in video signals derived from a magnetic recording thereof and including horizontal synchronization pulses occurring at a frequency which at least occasionally differs from a predetermined line frequency, comprising, in combination, first input means for supplying the video signals including horizontal synchronization pulses occurring at an at least occasionally varying frequency; second input means for supplying a sequence of reference pulses of predetermined pulse duration and at said predetermined line frequency; control means operatively connected wtih said first and second input means for producing a control voltage corresponding to the magnitude of a variable time lag between said horizontal synchronization pulses and said reference pulses; delay means operatively connected with said first input means for receiving said video signals and for delivering the same with a delay depending upon said control voltage, said delay means comprising a delay line including inductance means and conductor means arranged in parallel between the input end and the output end thereof and variode means connected transversely between said inductance and conductor means and having a capacity varying with the voltage applied thereto, a first and a second input amplifier means comprising each a grid-controllable amplifier tube and having the anode of the first amplifier tube connected in series with the cathode of the second one, the control grid of said first input amplifier tube being connected with said first input means, and the junction point between said first and second input amplifier means being connected with said input end of said delay line, and first and second output amplifier means comprising each a grid-controllable amplifier tube and having the anode of the first amplifier tube connected in series with the cathode of the second one, the junction point between said first and second output amplifier tubes being connected with said output end of said delay line, the control grids of said second input and second output amplifier tubes being both connected with said control means for being supplied thereby with said control voltage and for correspondingly changing the voltage applied by said input amplifier means to said variode means and consequently the delay applied by said delay line to said video signals; and output means connected with said second output amplifier means for delivering the video signal with a delay determined by said delay line, whereby time irregularities occurring in the video signals are automatically and immediately corrected.

9. An arrangement for correcting time irregularities appearing in video signals derived from a magnetic recording thereof and including horizontal synchronization pulses occurring at a frequency which at least occasionally differs from a predetermined line frequency, comprising, in combination, first input means for supplying the video signals including horizontal synchronization pulses occurring at an at least occasionally varying frequency; second input means for supplying a sequence of reference pulses of predetermined pulse duration and at said predetermined line frequency; control means operatively connected with said first and second input means for producing a control voltage corresponding to the magnitude of a variable time lag between said horizontal synchronization pulses and said reference pulses; delay means operatively connected with said first input means for receiving said video signals and for delivering the same with a delay depending upon said control voltage, said delay means comprising a delay line including inductance means and conductor means arranged in parallel between the input end and the output end thereof and variode means connected transversely between said inductance and conductor means and having a capacity varying with the voltage applied thereto, a first and a second input amplifier means comprising each a grid-controllable amplifier tube and having the anode of the first amplifier tube connected in series with the cathode of the second one, the control grid of said first input amplifier tube being connected with said first input means, and the junction point between said first and second input amplifier means being connected with said input end of said delay line so that control voltage and said video signal are applied superimposedly to said delay line, and first and second output amplifier means comprising each a grid-controllable amplifier tube and having the anode of the first amplifier tube connected in series with the cathode of the second one, the junction point between said first and second output amplifier tubes being connected with said output end of said delay line, the control grids of said second input and second output amplifier tubes being both connected with said control means for being supplied thereby with said control voltage and for correspondingly changing the voltage applied by said input amplifier means to said variode means and consequently the delay applied by said delay line to said video signals, said second output amplifier means being a differential amplifier so that only said video signal is delivered at its output; and output means connected with said second output amplifier means for delivering the video signal with a delay determined by said delay line, whereby time irregularities occurring in the video signals are automatically and immediately corrected.

10. An arrangement for correcting time irregularities appearing in video signals derived from a magnetic recording thereof and including horizontal synchronization pulses occurring at a frequency which at least occasionally differs from a predetermined line frequency, comprising, in combination, first input means for supplying the video signals including horizontal synchronization pulses occurring at an at least occasionally varying frequency; second input means for supplying a sequence of reference pulses of predetermined pulse duration and at said predetermined line frequency; control means operatively connected wtih said first and second input means for producing a control voltage corresponding to the magnitude of a variable time lag between said horizontal synchronization pulses and said reference pulses; delay means operatively connected with said first input means for receiving said video signals and for delivering the same with a delay depending upon said control voltage, said delay means comprising a first delay line including inductance means and conductor means arranged in parallel between the input end and the output end thereof and variode means connected transversely between said inductance and conductor means and having a capacity varying with the voltage applied thereto, a first and a second input amplifier means comprising each a grid-controllable amplifier tube and having the anode of the first amplifier tube connected in series with the cathode of the second one, the control grid of said first input amplifier tube being connected with said first input means, and the junction point between said first and second input amplifier means being connected with said input end of said delay line, and first and second output amplifier means comprising each a grid-controllable amplifier tube and having the anode of the first amplifier tube connected in series with the cathode of the second one, the junction point between said first and second output amplifier tubes being connected with said output end of said delay line, the control grids of said second input and second output amplifier tubes being both connected with said control means for being supplied thereby with said control voltage and for correspondingly changing the voltage applied by said input amplifier means to said variode means and consequently the delay applied by said delay line to said video signals, a second delay line having a signal transit time substantially equal to the mean transit time of said first delay line being inserted between said control means and said second output amplifier means; and output means connected with said second output amplifier means for delivering the video signal with a delay determined by said delay line, whereby time irregularities occurring in the video signals are automatically and immediately corrected.

No references cited.

DAVID G. REDINBAUGH, *Primary Examiner.*